(No Model.)

E. N. CRANE.
BRIDLE BIT.

No. 350,348. Patented Oct. 5, 1886.

Witnesses.
Wm Rheem.
Philip ___

Inventor.
Edward N. Crane
By Chas. J. Hedrick
his attorney

UNITED STATES PATENT OFFICE.

EDWARD N. CRANE, OF NEWARK, NEW JERSEY, ASSIGNOR TO CRANE & CO., OF SAME PLACE.

BRIDLE-BIT.

SPECIFICATION forming part of Letters Patent No. 350,348, dated October 5, 1886.

Application filed December 31, 1885. Serial No. 187,257. (No model.)

*To all whom it may concern:*

Be it known that I, EDWARD N. CRANE, a citizen of the United States, residing at Newark, in the county of Essex, State of New Jersey, have invented certain new and useful Improvements in Bridle-Bits, of which the following specification is a full, clear, and exact description.

This invention relates more particularly to that class of bridle-bits which have a check-bit connected with the mouth-piece or driving-bit at or near the middle.

It consists in a mouth-bit having a core covered with rubber and comprising a central portion carrying a metal bar or eye and end sections composed of chains, in combination with a check-bit attached to said bar or eye.

Figure 1:
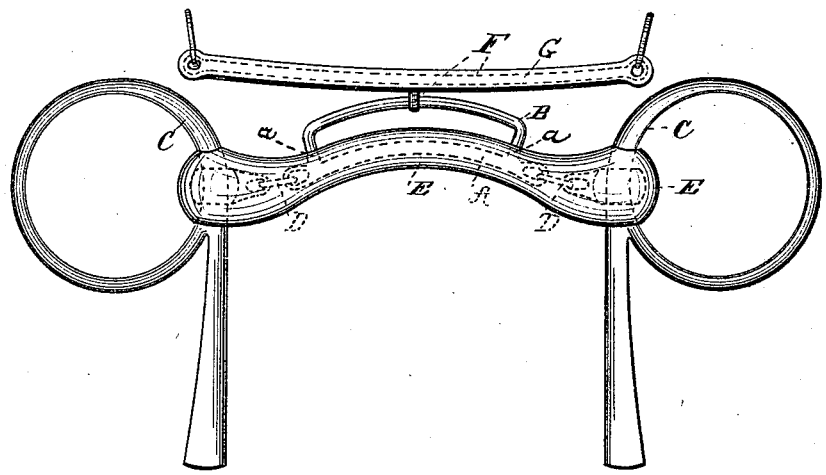
Figure 2:
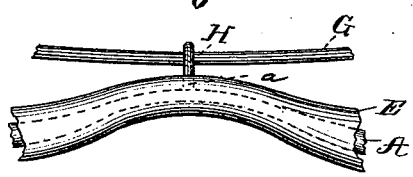
Figure 3:
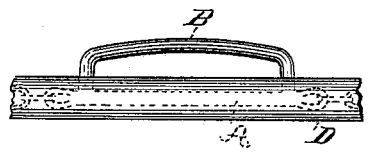

In the accompanying drawings, Figure 1 is an elevation of a driving-bit constructed in accordance with the invention; and Figs. 2 and 3 partial views of other forms, also within the invention.

Referring to Fig. 1, the mouth-bit consists of a center piece, A, having a raised bar, B, formed in one piece with or otherwise attached at the ends to said center piece, the cheek-pieces C, the chains D, connecting the ends of the center piece with the cheek-pieces, and the rubber covering E. As shown, the center piece, A, is curved upward in the middle to form a tongue-space on the under side. The bar B is not covered with rubber, but the latter is molded around the center piece under said bar and also around the ends of the bar. The rubber is preferably made thinner at the middle. The bar B projects outside the rubber in order to form the metal connection with the check-bit. The shank portion *a* of the raised bar surrounded by the rubber is of such a length (greater than the thickness of the rubber covering) that the eye on the check-bit is held away from the rubber covering. As shown, this connection is made by the eye F, which is attached to the check-bit G and slides on the bar B. The check-bit G is covered with rubber, the eye projecting through the same to make a metal connection with the bar B. A metal connection between the bit is desirable, so as to allow a free sliding action.

In Fig. 2 the mouth-bit is made the same as in Fig. 1, except that it is provided with an eye, H, in place of a raised bar, B. This eye, which has a shank portion, *a*, of such length as to extend through the rubber covering, encircles and slides upon the check-bit G, which is not covered with rubber, as this would interfere with the free movements of the bits.

In Fig. 3 the center piece, A, and bar B are shown straight, instead of curved. The construction of Fig. 1 is preferable, not only as affording room for the animal's tongue, but also because the eye on the check-bit will naturally seek the highest point or middle of the bar.

Modifications can be made in details without departing from the spirit of the invention.

The center piece of the mouth-piece and the device (the bar or eye) by which it is connected with the check-bit are preferably one forging.

I claim—

The mouth-bit having a core covered with rubber and consisting of a central portion carrying a metal bar or eye and end sections composed of chains, in combination with a check-bit attached to the bar or eye, substantially as described.

In testimony whereof I affix my signature in presence of two witnesses.

EDWARD N. CRANE.

Witnesses:
C. J. HEDRICK,
PHILIP MAURO.